United States Patent [19]

Hutt

[11] Patent Number: 4,717,277

[45] Date of Patent: Jan. 5, 1988

[54] WRITING POINT AND METHOD FOR THE PRODUCTION THEREOF

[76] Inventor: Rudi Hutt, Jaegerstrasse, D-7065 Winterbach bei Stuttgart, Fed. Rep. of Germany

[21] Appl. No.: 883,888

[22] Filed: Jul. 9, 1986

[30] Foreign Application Priority Data

Jan. 21, 1986 [DE] Fed. Rep. of Germany ....... 3601676

[51] Int. Cl.⁴ ............................ B43K 710; B23P 11/00

[52] U.S. Cl. ................................ 401/216; 29/441 BP; 401/213; 401/220

[58] Field of Search ............. 29/441 BP; 15/444, 445; 401/209, 213, 216, 220

[56] References Cited

U.S. PATENT DOCUMENTS

| | | | |
|---|---|---|---|
| 2,879,586 | 3/1959 | Fehling et al. | 401/216 X |
| 4,134,199 | 1/1979 | Laguori | 29/441 BP |
| 4,500,222 | 2/1985 | Clading-Boel | 401/216 X |
| 4,547,946 | 10/1985 | Osaki et al. | 29/441 BP X |
| 4,547,947 | 10/1985 | Oshita | 29/441 BP X |
| 4,603,994 | 8/1986 | Mitsuda et al. | 401/216 X |

FOREIGN PATENT DOCUMENTS

| | | | |
|---|---|---|---|
| 66541 | 12/1982 | European Pat. Off. | 401/216 |
| 965139 | 9/1950 | France | 401/216 |
| 1032475 | 7/1953 | France | 29/441 BP |
| 2065565 | 7/1981 | United Kingdom | 401/216 |

*Primary Examiner*—Howard N. Goldberg
*Assistant Examiner*—Ronald S. Wallace
*Attorney, Agent, or Firm*—Jordan and Hamburg

[57] ABSTRACT

A method for the production of a writing point for liquid ink by utilizing a tube (5) of small internal diameter and a writing point which is produced thereby are proposed. In such a case, axially extending ink channels (3) are provided in the internal wall of the fixed tube (5) having an internal diameter which substantially corresponds to the diameter of a ball (1), said channels (3) extending to the free end of the tube (5) and being spaced from one another. A circumferential, annular recess (9) is formed in the tube (5) at a distance from the free end of said tube, and the ball (1) is inserted into the free end until it abuts against the recess (9). Subsequently, the free edge of the tube (5) is inwardly flanged, and a substantially cylindrical ink conductor (4) is inserted into the remote end of the tube and partially overlapped by the ink channels (3).

6 Claims, 3 Drawing Figures

WRITING POINT AND METHOD FOR THE PRODUCTION THEREOF

The invention relates to a writing point with a ball for liquid ink, including a tube of small diameter which is provided with a recess serving to abut against the ball, an ink conductor being provided in the tube and substantially filling the interior of said tube. The invention also relates to a method of producing such a writing point.

In European Patent Application No. 0066541 (Application No. 82810220.1), there is described a method for the production of a ball pen point which is fed with liquid ink, this method being based on a small tube having an internal diameter of 1mm. For the production of the writing point and for the accommodation of the ball, this small tube is subjected to various deformation steps, whereby, in particular, the internal diameter of the small tube is reduced in several stages in the region of the point. In such a case, the free end of the small tube is resiliently deformed so that the ball can be urged into position from the front and so that the point resiliently surrounds the ball. An ink conductor extends within the front portion of the writing point and is axially spaced from the ball. By rotating the ball, the writing fluid is drawn from the ink reservoir to a chamber and then conducted to the periphery of the ball. To produce this known writing point, a number of operational and deformation steps are required which, collectively, make the writing point complex from a technical viewpoint, and an additional disadvantage can be seen to reside in the fact that the chamber, which is profiled in the region of the ball support in the form of spaced-apart, conical recesses, is not uniformly filled with writing fluid.

Accordingly, the invention seeks to provide a method of producing a writing point for liquid ink of the above-described type and to propose a writing point which is safe and effective to operate without requiring the utilisation of technically complex means.

For a method according to the invention, this object is achieved in that axially extending ink channels are provided in the internal wall of the fixed tube having an internal diameter which substantially corresponds to the diameter of the ball, said channels extending to the free end of the tube and being spaced from one another; a circumferential, annular recess is then made in a portion of the tube at a distance from the free end of said tube to form a seat for the ball; and the ball is inserted into the free end until it abuts against the recess; and finally the free edge of the tube is flanged inwardly, and a substantially cylindrical ink conductor is inserted into the remote end of the tube.

The writing point according to the invention comprises a tube of small diameter which is provided with a recess for abutment with a ball, and an ink conductor is provided in the tube, substantially filling the interior of the tube, wherein with the exception of the circumferential recess which has a cylindrical cross-section, the tube has say a constant diameter throughout its length, and wherein ink channels are provided in the front portion of the tube and extend parallel to one another with a distance therebetween in the internal wall of said tube, the length of said channels being so dimensioned that they partially surround the ink conductor, and the ball is held between the circumferential recess, which forms a ball supporting surface, and an inwardly bent edge at the free end of the tube.

The considerable advantage of the proposal according to the invention is that a thin-walled tube can be used having a diameter which substantially corresponds to the diameter of the ball, and the provision of the axially extending ink channels which partially overlap the ink conductor located further behind in the tube ensures, in particular, a very good ink contact between the ink conductor and ball, so that such a writing instrument can produce lines of a uniform thickness. In addition, the writing point according to the invention is simple to produce and, as a result, is economical.

The invention will now be described further by way of example only with reference to the accompanying drawings; in which.

Figure 1:
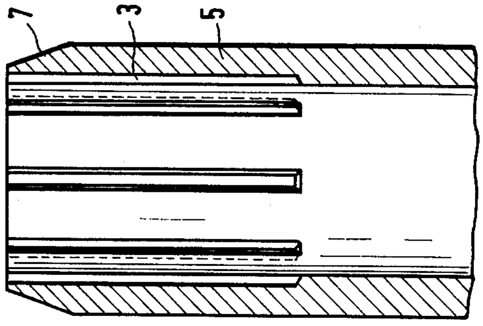
FIG. 1 is a sectional view of a tube which is provided, in its internal wall, with axially extending ink channels which are distributed over the periphery.

As shown in FIG. 1, a thin-walled tube 5 having an internal diameter of approximately 0.51 mm is used for the production of the writing point. In the front portion, which subsequently serves to accommodate a ball, axially extending grooves or channels 3 are provided which are circumferentially spaced-apart in the internal wall of the tube 5 and, in particular, are so formed by the tube 5 being fixed in a clamp and centered, and then these channels are introduced by means of a ram which is in the form of a profile needle with sharp edges. The material which is removed from the channels 3 is forced away be means of an additional ram and, at the same time, the internal periphery of the tube 5 in the region of these channels 3 is trimmed. An external cone/outer taper 7 is provided in the front portion of the free end of the tube.

Figure 3:
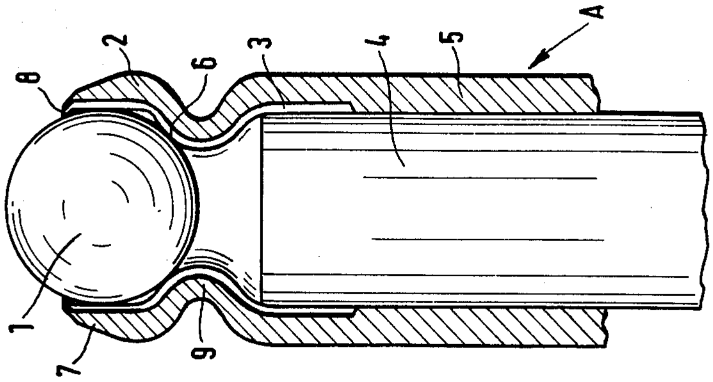
FIG. 3 is a sectional view of the complete writing point.

The axial length of the channels 3 is essential because they extend from the free end of the tube over such a length that later, when an ink conductor 4 is inserted from the other side of the tube, said conductor 4 is substantially surrounded, especially at an end thereof by the channels 3 (FIG. 3).

Figure 2:
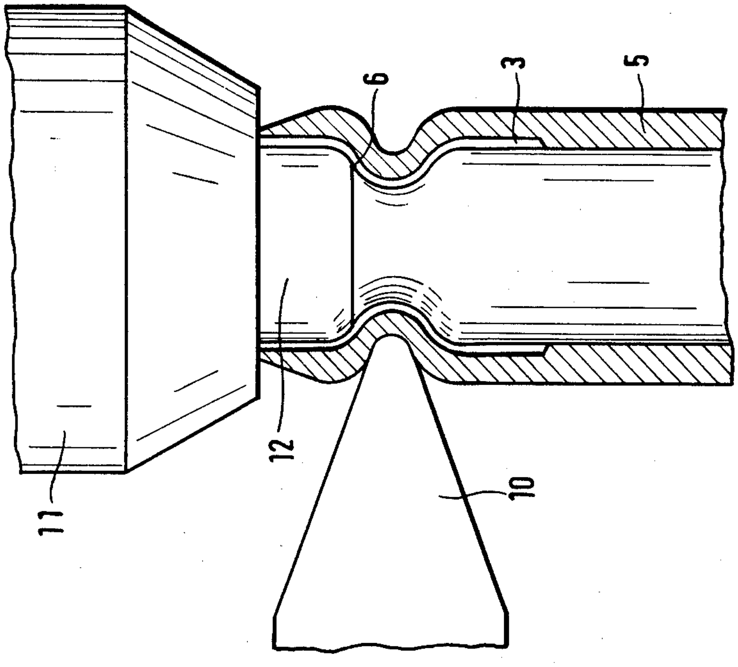
FIG. 2 illustrates the tube portion of FIG. 1 after it has been rolled inwardly after the recess has been formed.

A circumferential, annular recess 9 is formed by means of a tool 10 (FIG. 2). A ball support 6 is created by this continuous recess. As clearly shown in FIG. 2, the channels 3 follow the internal wall of the tube in the region of the recess.

For the exact, centered provision of the annular tapering of the tube in the region of the recess 9, a ram 12 of a tool 11 is inserted into the free end of the tube, thereby ensuring that the recess is formed in the tube at the desired location.

Finally, FIG. 3 illustrates a ready-assembled writing point. There, a ball 1 is inserted into the front portion 2 which serves as the receiver for the ball 1 which abuts against the portion 6 of the recess 9. The free end 8 of the tube is inwardly flanged so that, in this portion, the tube diameter is smaller than that of the ball. In this way, the ball 1 is securely held in the tube without requiring the use of complex tools for the inwardly flanging operation. An ink conductor 4, which is formed from an absorbent material and is substantially cylindrical, is inserted into the remote end of the tube 5 to such an extent that its front portion facing the ball 1 is surrounded by the channels 3. This overlapping of the ink conductor 4 and channels 3 ensures a uniform, continuous flow of ink from the ink conductor 4 to the ball 1, so that the writing point can produce lines of a constant thickness.

I claim:

1. In a writing point having a ball for liquid ink, comprising a tube of small diameter which is provided with a recess for abutment with the ball, an ink conductor being provided in the tube and substantially filling the interior of said tube, the ball being held between the recess, which forms a ball supporting surface, and an inwardly bent edge at the free end of the tube, the improvement wherein said recess is annular, said tube has a substantially constant diameter exept at said recess and front end, ink channels are provided in the front portion of the tube and extend parallel to one another with a spacing therebetween in the internal wall of said tube, the length of said channels being so dimensioned that they partially surround the ink conductor, extending through the area of said recess whereby they have the same profile as said recess in cross section.

2. A writing point as claimed in claim 1, in which there is a small clearance between the ball and its holder.

3. A writing point as claimed in claim 1, in which an external cone/outer taper is provided at the free end of the tube.

4. A writing point as claimed in claim 1, in which the internal diameter of the tube substantially corresponds to the diameter of the ball, and the recess is provided at such a distance from the free end of the tube that the ball protrudes accordingly.

5. A method of producing a writing point having a ball for liquid ink by utilising a tube having a small internal diameter, comprising providing axially extending ink channels in the internal wall of the tube having an internal diameter which substantially corresponds to the ball diameter, with said ink channels extending throughout a given length thereof from the free end of the tube and being spaced fom one another; making a circumferential, annular recess in a portion of the tube spaced from the free end of said tube to form a seat for the ball, said annular recess being within said given length whereby said channels in the region of said recess have the profile in cross section of said recess; then inserting the ball into the free end until it abuts against the recess; inwardly flanging the free edge of the tube for retaining the ball and inserting a substantially cylindrical ink conductor into the remote end of the tube up to said given length.

6. A method as claimed in claim 5, in which the ink channels commencing from the free end of the tube are longitudinally provided/introduced and trimmed, and the free end of the tube, which is clamped in a holder, abuts during formation of the recess against a pressing tool having a ram which protrudes into the tube.

* * * * *